(12) United States Patent (10) Patent No.: US 7,403,898 B2
Slemmer et al. (45) Date of Patent: Jul. 22, 2008

(54) METHODS, SYSTEMS, AND STORAGE MEDIUMS FOR IMPLEMENTING VOICE-COMMANDED COMPUTER FUNCTIONS

(75) Inventors: John B. Slemmer, Norcross, GA (US); Ryan Schaub, Snellville, GA (US); Ronald Perrella, Norcross, GA (US)

(73) Assignee: AT&T Delaware Intellectual Property, Inc.,, Wilming, DE (US)

( * ) Notice: Subject to any disclaimer, the term of this patent is extended or adjusted under 35 U.S.C. 154(b) by 804 days.

(21) Appl. No.: 10/923,657

(22) Filed: Aug. 20, 2004

(65) Prior Publication Data

US 2006/0041433 A1 Feb. 23, 2006

(51) Int. Cl.
*G10L 11/00* (2006.01)
(52) U.S. Cl. ....................................................... 704/275

(58) Field of Classification Search ................. 704/275, 704/270.1
See application file for complete search history.

(56) References Cited

U.S. PATENT DOCUMENTS

| 5,632,002 A | * | 5/1997 | Hashimoto et al. .......... 704/231 |
| 5,983,200 A | * | 11/1999 | Slotznick ..................... 705/26 |
| 6,584,439 B1 | * | 6/2003 | Geilhufe et al. ............. 704/270 |
| 2003/0130016 A1 | * | 7/2003 | Matsuura et al. ............ 455/569 |

* cited by examiner

*Primary Examiner*—Michael N Opsasnick
(74) *Attorney, Agent, or Firm*—Cantor Colburn LLP

(57) ABSTRACT

Exemplary embodiments include a method, system, and storage medium for implementing voice-initiated computer functions. The method includes translating a voice command into a machine-readable format. The voice command requests implementation of a function. The method also includes executing the function requested in the voice command, and acknowledging whether the function was successfully completed.

19 Claims, 2 Drawing Sheets

METHODS, SYSTEMS, AND STORAGE MEDIUMS FOR IMPLEMENTING VOICE-COMMANDED COMPUTER FUNCTIONS

BACKGROUND OF INVENTION

The present invention relates generally to communications services, and more particularly, to methods, systems, and storage mediums for implementing voice-initiated computer functions.

Computer-based systems and applications are becoming more sophisticated over time as advancements are made in the associated hardware/software technologies such as communications protocols, systems standardization, and networks. As the costs of computers and processor-enabled devices decrease, more consumers are acquiring a number of these devices and creating home networks for their personal and/or business use. Additionally, a significant portion of the day may be spent in front of these devices performing, for example, tasks such as word processing, web surfing, messaging, etc. Studies have shown that the more time an individual spends at a computer, particularly without taking regular breaks, the greater the likelihood that this individual will develop muscle strains, poor circulation, eye strain, and similar types of injuries that can lead to more serious health issues and result in diminished productivity. Unfortunately, however, it is often the case that such individuals have little recourse in that their jobs or businesses require that many hours be spent on the computer.

What is needed, therefore, is way to perform the various computer functions needed or desired without requiring that individuals maintain a stationary position.

SUMMARY OF INVENTION

Exemplary embodiments of the invention include methods, systems, and storage mediums for implementing voice-initiated computer functions. Methods include translating a voice command into a machine-readable format. The voice command requests implementation of a function. The method also includes executing the function requested in the voice command, and acknowledging whether the function was successfully completed.

Exemplary systems for implementing voice-initiated computer functions include a computer device executing an operating system, a voice recognition application, and at least one user application. Systems also include a speech/text interface application executing on the computer device. The speech/text interface application translates a voice command received at the computer device into a machine-readable format. The voice command requests implementation of a function. The speech/text interface application also executes the function requested in the voice command. Systems also include a text-to-speech engine executing on the computer device. The speech/text interface application provides an acknowledgement message to the text-to-speech engine. The acknowledgement message indicates whether the function was successfully completed.

Storage mediums encoded with machine-readable program code for implementing voice-initiated computer functions are also provided. The program code includes instructions for causing a computer to implement a method. The method includes translating a voice command into a machine-readable format. The voice command requests implementation of a function. The method also includes executing the function requested in the voice command, and acknowledging whether the function was successfully completed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION

In accordance with exemplary embodiments, the speech/text interface includes an application programming interface (API) that enables individuals to perform a wide variety of computer-based tasks while enjoying more freedom of movement than what is currently required with existing systems. The speech/text interface receives voice commands from a wireless digital headset via a base unit. The voice commands relate to the performance of computer-based tasks such as word processing, messaging, web functions, and similar types of activities. The voice commands are translated into signals recognized by the computer applications receiving the voice commands. The commands are executed and the results of the execution are acknowledged to the user via a text-to-speech synthesizer. These functions may be completed without the requirement that the user be at the computer.

Figure 1:
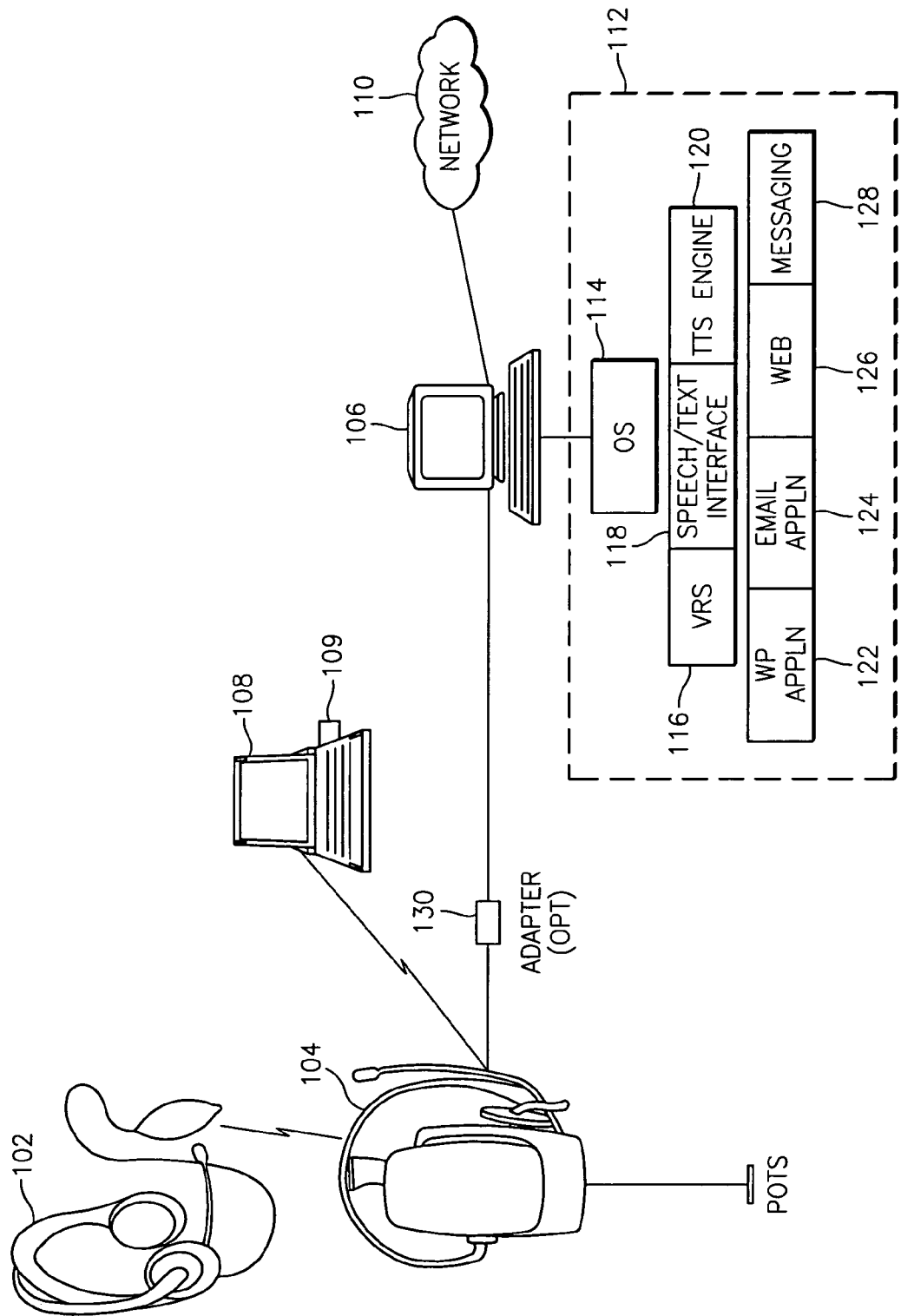
FIG. 1 is a block diagram of a system upon which the speech/text interface may be implemented in exemplary embodiments.

Referring now to FIG. 1, an exemplary system for implementing the speech/text interface will now be described. The system of FIG. 1 includes a cordless digital headset 102, a base unit 104, computer device 106 and laptop 108. Cordless digital headset 102, base unit 104, computer device 106, and laptop 108 may comprise a home network or small office/home office (SOHO). The cordless (i.e., wireless) digital headset 102 includes a microphone and receiver for sending and receiving voice communications to and from base unit 104. Cordless digital headset 102 may include a processor for executing an application for performing all or a portion of the speech/text interface features described herein. Additionally, cordless digital headset 102 may include physical controls for executing commands in furtherance of the features provided by the speech/text interface as described further herein. Cordless digital headset 102 communicates with base unit 104 over a limited range using, e.g., radio wave technology. For example, the range may be 100-300 feet at a rate of 900 MHz (and may increase to 2.4 GHz using, e.g., Digital Spread Spectrum (DSS) technology). Cordless digital headset 102 may employ, e.g., a telephone feature that enables a user to place telephone calls over a circuit-switched telephone network via the base unit 104.

In exemplary embodiments, base unit 104 receives voice signals from cordless digital headset 102, converts them to electrical signals, and sends the signals to computer 106 via, e.g., a wireline cable. The wireline cable may terminate at a sound card on computer 106, or alternatively, an adaptor 103 may be installed between the base unit 104 cable and the computer 106 whereby the adapter 103 is terminated on a universal serial bus (USB) port on computer 106. The adaptor 130 eliminates the requirement of compatibility between the sound card and the base unit 104.

If devices 102-108 comprise a home or business network, then base unit 104 may also receive from (and send to) laptop 108 signals via, e.g., a gateway router (not shown) employed by computer 106 and a network card 109 coupled to laptop 108. Base unit 104 may include telephone capabilities whereby cordless digital headset 102 initiates telephone calls, base unit 104 receives the signals, and forwards the signals to a plain old telephone service (POTS) line via a telephone jack installed on base unit 104. Additionally, if computer device 106 is Internet-telephony enabled, base unit 104 may forward the telephone signals from cordless digital headset 102 to computer 106, whereby computer 106 converts the signals and sends them over a packet-switched network such as network 110.

In exemplary embodiments, computer device 106 refers to a personal computer or desktop system that includes a processor, memory, input/output interfaces, and applications. Computer device 106 may subscribe to an Internet service, one or more messaging services, and may employ a web browser for performing web functions. Additionally, computer device 106 may include networking software and hardware for communicating with other network nodes such as laptop 108 via local area network (LAN). Similarly, laptop 108 may employ the same features as described above with respect to 106. Laptop 108 may communicate wirelessly with computer device 106 via the LAN.

Network 110 may comprise any packet-switched network including an Internet, Extranet, Virtual Private Network, etc.

In exemplary embodiments, an application executing on computer device 106 executes the speech/text interface as described herein. In alternate embodiments, all or a portion of the speech/text interface application 118 may be executed on computer device 106. The speech/text interface may reside between an operating system 114 and an application layer (third layer) that includes applications such as a word processing application 122, an email application 124, a web browser 126, and messaging applications 128, to name a few. The text/speech interface application 118 may form part of a second layer that includes a voice recognition software application 116 and a text-to-speech synthesizer 120. These applications are collectively referred to as applications 112. The text/speech interface application 118 may include an application programming interface for communicating with applications 112. Further, speech/text interface application 118 may include a database of predefined user prompts and responses that are utilized for communicating command functions, information, and execution results of activities conducted between a user on cordless digital headset 102 and the applications being executed. The speech/text interface application 118 may also employ communications protocols for implementing the voice-initiated activities of the user. For example, if a web search command is issued by a user, the speech/text interface application 118 may implement protocols developed by, e.g., Speech Application Language Tags (SALT), a communication protocol developed by the Speech Application Language Tags (SALT) Forum for executing web-based functions for voice using HTML. In another example, if a user executes a voice telephone call to be implemented over the Internet, the speech/text interface application 118 may employ VoIP for facilitating Internet telephony communications.

Figure 2:
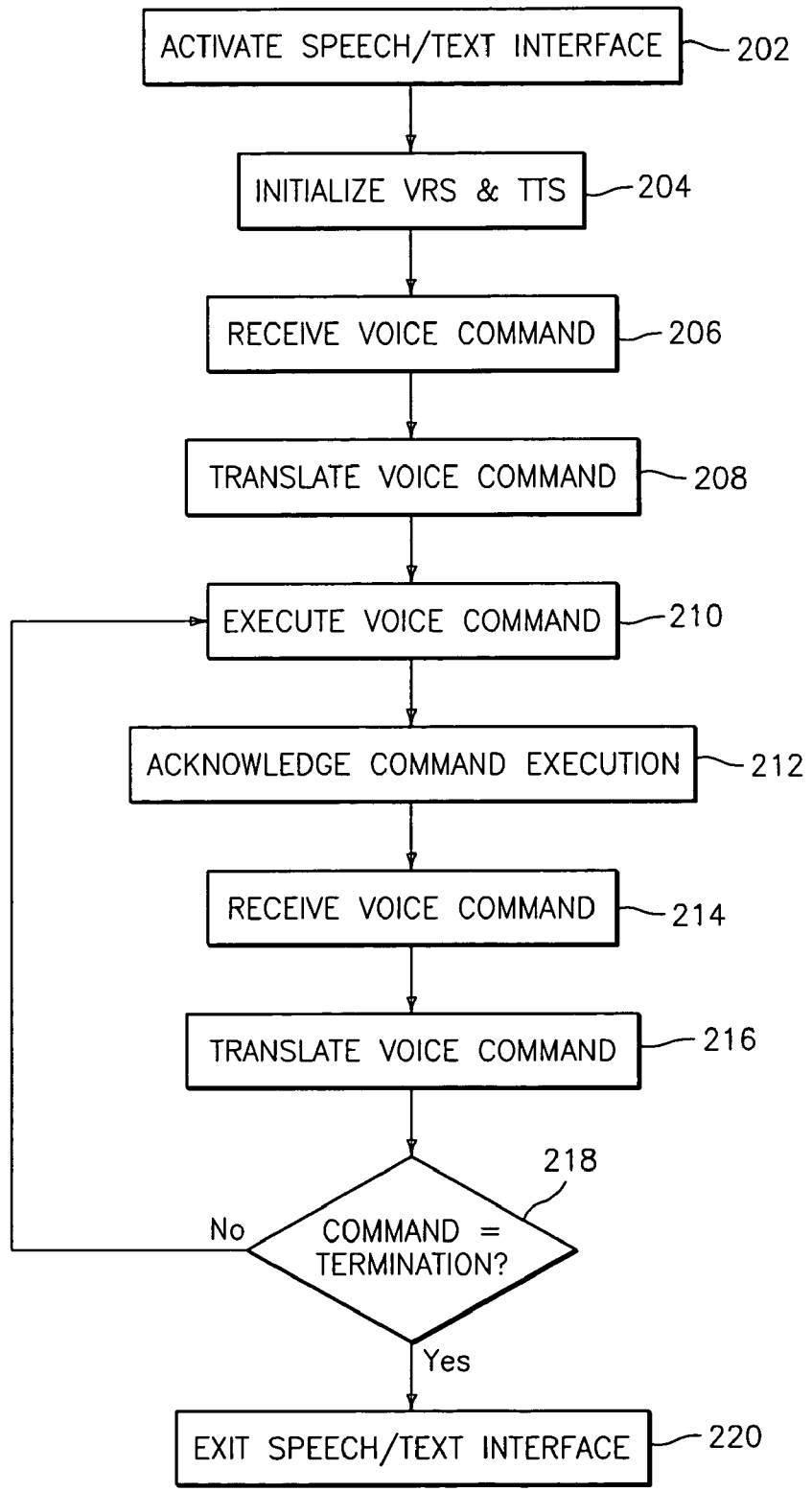
FIG. 2 is a flow diagram describing a process for implementing the speech/text interface in exemplary embodiments.

As indicated above, a user may perform a variety of computer-related tasks via the speech/text interface application, such as sending and receiving email messages, creating and editing word processing documents, performing Web activities (e.g., searching web sites/pages, making a purchase, researching a subject, etc.), sending/receiving instant messages/text messages, and other activities. An exemplary process for performing a task utilizing the speech/text interface application 118 will now be described with respect to FIG. 2. For illustrative purposes, it is assumed that a user is performing an email function.

At step 202, the speech/text interface application 118 is activated. This may be accomplished by, e.g., manually opening the application 118 on the computer device 106, activating a switch or control provided on the cordless digital headset 102, or by a voice command issued by the user and defined for this purpose. The speech/text application 118 initializes the voice recognition software 116 and text-to-speech engine 120 at step 204 so that these applications are prepared to receive input. At step 206, a voice command (e.g., open email) is issued by the user from cordless digital headset 102 and received at the computer device 106.

Voice recognition software 116 translates the voice command at step 208. The speech/text interface application 118 receives the translated voice command and accesses the application (e.g., email application 124) at step 210. The speech/text interface application 118 retrieves a database text correlating to the function executed in step 210 (e.g., when email opens, acknowledge the successful execution and prompt the user with options for retrieving, creating, sending, etc. a message). Accordingly, at step 212, the speech/text interface application 118 acknowledges the execution of the command (e.g., opening the email application 124). The acknowledgement is converted to speech via text-to-speech engine 120 and transmitted to the user on cordless digital headset 102. Likewise, the speech/text interface application 118 prompts the user for the next command by converting the prompts to speech as described above.

At step 214, the speech/text interface application 118 receives the next voice command (e.g., open new email messages). The command is translated by voice recognition software 116 at step 216. The speech/text interface application 118 checks each voice command to determine whether it is a termination command such as, e.g., 'exit' at step 218. If the command is a termination command, the speech/text interface application 118 closes at step 220. Otherwise, the process returns to step 210, whereby the command is executed.

As described above, the speech/text interface enables individuals to perform a wide variety of computer-based tasks while enjoying more freedom of movement than what is currently required with existing systems. The speech/text interface receives voice commands from a wireless digital headset that relate to the performance of computer-based tasks such as word processing, messaging, web functions, and similar types of activities. The voice commands are translated into signals recognized by the computer applications receiving the voice commands. The commands are executed and the results of the execution are acknowledged to the user via a text-to-speech synthesizer. These functions may be completed without the requirement that the user be at the computer.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing voice-commanded, application-specific functions, comprising:
    receiving voice commands at a cordless digital headset, the cordless digital headset including a processor executing a voice recognition application, a text-to-speech engine, and a speech/text interface application, the cordless digital headset in communication with user applications, the user applications including a word processing application, an email application, and a web browser application;
    the voice recognition application, text-to-speech engine, and speech/text interface application collectively implementing:
    translating the voice commands into a machine-readable format, the voice commands requesting activation of one of the user applications and implementation of an application-specific function with respect to the activated user application;
    executing the application-specific function requested in the voice commands; and
    providing an acknowledgement message to the text-to-speech engine, the acknowledgement message indicating whether the application-specific function was successfully completed.

2. The method of claim 1, wherein providing the acknowledgement message includes converting a digital acknowledgement message into a speech message and presenting the speech message to the cordless digital headset.

3. The method of claim 1, wherein the user applications further includes at least one of:
    an Internet telephony application; and
    a messaging application including at least one of:
    an instant message application; and
    a text messaging application.

4. The method of claim 3, wherein the speech/text interface application employs communications protocols specific to the activated user application;
    wherein the communication protocol employed for the Internet telephony application includes Voice Over Internet Protocol (VoIP).

5. The method of claim 1, wherein the speech/text interface application employs communications protocols specific to the activated user application.

6. The method of claim 5, wherein the communication protocol employed for the web browser application includes Speech Application Language Tags (SALT).

7. A system for implementing voice-commanded, application-specific functions, comprising:
    a cordless digital headset including a processor, the processor executing a voice recognition application, a text-to-speech engine, and a speech/text interface application, the cordless digital headset in communication with user applications, the user applications including a word processing application, an email application, and a web browser application;
    wherein the voice recognition application, text-to-speech engine, and speech/text interface application collectively perform a method, comprising:
    translating voice commands received at the cordless digital headset into a machine-readable format, the voice commands requesting activation of one of the user applications and implementation of an application-specific function with respect to the activated user application;
    executing the application-specific function requested in the voice commands; and
    providing an acknowledgement message to the text-to-speech engine, the acknowledgement message indicating whether the application-specific function was successfully completed.

8. The system of claim 7, wherein the speech/text interface application employs communications protocols specific to the activated user application.

9. The system of claim 8, wherein the communication protocol employed for the web browser application includes Speech Application Language Tags (SALT).

10. The system of claim 7, wherein the user applications further include at least one of:
    an Internet telephony application; and
    a messaging application including at least one of:
    an instant message application; and
    a text messaging application.

11. The system of claim 10, wherein the speech/text interface application employs communications protocols specific to the activated user application;
    wherein the communication protocol employed for the Internet telephony application includes Voice Over Internet Protocol (VoIP).

12. The system of claim 7, wherein the acknowledgement message is converted to speech and presented to the cordless digital headset.

13. The system of claim 12, the cordless digital headset is in communication with the computer device via a base unit, wherein upon converting the acknowledgement message to speech, the speech/text interface application transmits the acknowledgement message to the cordless digital headset;
    wherein, the computer device executes the user applications.

14. The system of claim 13, further comprising:
    a wireless computer device in communication with the computer device via a local area network, wherein the cordless digital headset sends the voice commands to the computer device via the wireless computer device and the base unit.

15. A storage medium including machine-readable program code for implementing voice-commanded, application-specific functions, the program code including instructions for causing a processor to implement a method, comprising:

receiving voice commands at a cordless digital headset, the cordless digital headset including the processor, the processor executing a voice recognition application, a text-to-speech engine, and a speech/text interface application, the cordless digital headset in communication with user applications, the user applications including a word processing application, an email application, and a web browser application;

the voice recognition application, text-to-speech engine, and speech/text interface application collectively implementing a method, comprising:

translating the voice commands into a machine-readable format, the voice commands requesting activation of one of the user applications and implementation of an application-specific function with respect to the activated user application;

executing the application-specific function requested in the voice commands; and providing an acknowledgement message to the text-to-speech engine, the acknowledgement message indicating whether the application-specific function was successfully completed.

16. The storage medium of claim 15, wherein the user applications further include at least one of:

an Internet telephony application; and a messaging application including at least one of:

an instant message application; and a text messaging application.

17. The storage medium of claim 16, wherein the speech/text interface application employs communications protocols specific to the activated user application;

wherein the communication protocol employed for the Internet telephony application includes Voice Over Internet Protocol (VoIP).

18. The storage medium of claim 15, wherein the speech/text interface application employs communications protocols specific to the activated user application.

19. The storage medium of claim 18, wherein the communication protocol employed for the web browser application includes Speech Application Language Tags (SALT).

* * * * *